United States Patent
Moriyama et al.

[11] Patent Number: 6,001,416
[45] Date of Patent: Dec. 14, 1999

[54] OXIDE THIN FILM AND PROCESS FOR FORMING THE SAME

[75] Inventors: Hiroaki Moriyama; Keiichi Nashimoto, both of Minami Ashigara, Japan

[73] Assignee: Fuji Xerox Co., Ltd., Tokyo, Japan

[21] Appl. No.: 09/189,932

[22] Filed: Nov. 12, 1998

Related U.S. Application Data

[62] Division of application No. 08/561,326, Nov. 21, 1995.

[30] Foreign Application Priority Data

Nov. 24, 1994 [JP] Japan ................................. 6-312366
Nov. 9, 1995 [JP] Japan ................................. 7-290732

[51] Int. Cl.$^6$ ...................................................... B05D 5/12
[52] U.S. Cl. ......................... 427/100; 427/100; 427/226; 427/228; 427/380
[58] Field of Search ................................. 427/100, 226, 427/228, 380

[56] References Cited

U.S. PATENT DOCUMENTS

| | | | |
|---|---|---|---|
| 3,413,083 | 11/1968 | Daendiker ................................. 23/24 |
| 3,647,364 | 3/1972 | Mazdiyasni et al. ................. 260/429.5 |
| 4,587,041 | 5/1986 | Uedaira et al. . | |
| 4,946,710 | 8/1990 | Miller et al. ......................... 427/126.3 |
| 5,308,601 | 5/1994 | Hampden-Smith et al. ........... 423/593 |
| 5,445,806 | 8/1995 | Kinugasa et al. . | |
| 5,456,945 | 10/1995 | McMillan et al. ..................... 427/252 |
| 5,571,495 | 11/1996 | Iijima et al. . | |
| 5,612,082 | 3/1997 | Azuma et al. ........................ 427/226 |
| 5,624,707 | 4/1997 | Azuma et al. . | |

FOREIGN PATENT DOCUMENTS 62-27482   6/1987   Japan .
4-19911    1/1992   Japan .

OTHER PUBLICATIONS

Hawley's Condensed Chemical Dictionary, 12th ed./revised by Richard J. Lewis, Sr., p. 231, Dec. 1993.
S. Hattangadi, "How to set a Periodic Table," *Ind. Chemist*, vol. 9(5), May, 1988, pp. 20–23.

*Primary Examiner*—Shrive Beck
*Assistant Examiner*—Paul D. Strain
*Attorney, Agent, or Firm*—Oliff & Berridge, PLC

[57] ABSTRACT

An oxide thin film comprising an oxide represented by $ABO_3$, wherein A comprises at least one element selected from the group consisting of the groups IA, IIA, IIIA, IVB and VB of the periodic table, and B comprises at least one element selected from the group consisting of the groups IVA and VA of the periodic table, wherein said oxide thin film has a mixed structure in which crystal grains are dispersed in an amorphous phase or an ultrafine grain phase. The oxide thin film is prepared by preparing an organic solvent solution (1) of a metal alkoxide compound of A and a metal alkoxide compound of B; adding water, or water and a catalyst to the organic solvent solution (1) to prepare a solution (2); mixing the organic solvent solution (1) and the solution (2) to prepare a mixed solution; coating the mixed solution on a substrate to form a thin film; and subjecting the thin film to heat treatment.

13 Claims, 2 Drawing Sheets

OXIDE THIN FILM AND PROCESS FOR FORMING THE SAME

This is a Division of application Ser. No. 08/561,326 filed Nov. 21, 1995, pending. The entire disclosure of the prior application is hereby incorporated by reference herein in its entirety.

FIELD OF THE INVENTION

This invention relates to an oxide thin film which is formed on a substrate by using an organometallic compound and to a process for preparing the same. The oxide thin film of the present invention is suitable for use in thin film condensers and capacitors, piezoelectric devices, pyroelectric devices, and the like.

BACKGROUND OF THE INVENTION

An oxide thin film has conventionally been obtained by dry film formation, such as sputtering or vacuum evaporation, or wet film formation, such as a sol-gel process. However, film formation in dry process requires very expensive equipment. Besides, since different elements have different vapor pressures, it is difficult to produce stoichiometrically excellent films in a stable manner; the resulting films have deteriorated crystal properties; and the productivity is low for the cost. These disadvantages have prevented dry film formation processes from being put to practical use in this field.

On the other hand, a sol-gel method using an organometallic compound is advantageous in terms of low initial cost, precise controllability of chemical composition, uniformity on molecular level, reduction of operation temperature, ease of obtaining large-area films, and the like, and has therefore been given due study in various fields. In general, a sol-gel method is a method for synthesizing an oxide thin film through hydrolysis and dehydrating condensation. It comprises coating a substrate with a solution in which a precursor is hydrolyzed with water, followed by heat treatment.

For example, JP-A-4-19911 (the term "JP-A" as used herein means an "unexamined published Japanese patent application") proposes a method for forming a ferroelectric thin film comprising lead titanate (PT), lead zirconate titanate (PZT), third component-doped PZT or lanthanum-doped lead zirconate titanate (PLZT) by using a solution prepared by dissolving an organometallic compound containing lead, lanthanum, titanium or zirconium in an organic solvent and adding thereto a stabilizer and a prescribed amount of water. However, because the process involves hydrolysis using 0.1 to 1.5 mol of water per 1 mol of a metallic atom, the resulting thin film shows grain growth and has an increased leakage current. Further, a polycrystalline oxide thin film obtained by the process is sometimes composed of crystal grains of several microns in diameter depending on the conditions of preparation. Observation of a cross section of such a thin film under a transmission electron microscope (TEM) revealed fine boundary voids among crystal grains in both the surface and the inside thereof as shown in FIG. 1. It seems that a leakage current increases due to electric conduction through these pinholes or boundaries.

JP-B-62-27482 (the term "JP-B" as used herein means an "examined published Japanese patent application") discloses a method comprising coating a glass substrate with a solution containing an organometallic compound, drying the coating film in air at ambient temperature for 30 minutes and then in a thermostat set at 110° C. for 30 minutes to complete hydrolysis reaction, and baking the coating layer in an electric furnace at a temperature of 550 to 800° C. while forcibly introducing steam into the furnace. Although hydrolysis does not take place before coating, the resulting thin film still suffers from an increase of leakage current due to the forced introduction of steam into the electric furnace after coating.

Many of these conventionally proposed oxide thin films are utilizable as a ferroelectric thin film. A ferroelectric thin film comprising these oxides exhibits many excellent characteristics, such as ferroelectric properties, piezoelectric properties, pyroelectric properties, electrooptic effects, and the like, and has therefore been used in various fields of electronics. In recent years, application to the memory cells of dynamic RAM (DRAM) has been attracting attention with the rapid advancement of integration, and there has been a demand for an improved process for preparing an oxide thin film.

SUMMARY OF THE INVENTION

An object of the present invention is to provide an oxide thin film formed on a substrate, which is uniform, exhibits excellent stoichiometry, and has a reduced leakage current and is therefore suitable for use in thin film capacitors, piezoelectric devices, pyroelectric devices, etc.

Another object of the present invention is to provide a process for preparing the above-described thin oxide film in a stable manner using a solution of an organometallic compound.

As a result of extensive investigations, the present inventors have found that an oxide thin film having a mixed structure composed of an amorphous phase or an ultrafine grain phase and crystal grains exhibits excellent dielectric characteristics and has a reduced leakage current. They have also found that an oxide thin film having such a mixed structure can be obtained coating a substrate with a mixed solution comprising (1) an organic solvent solution of a metal alkoxide compound and (2) a solution prepared by adding water to organic solvent solution (1), followed by heat treatment. The present invention has been completed based on these findings.

The present invention provides an oxide thin film comprising an oxide represented by $ABO_3$, wherein A comprises at least one element selected from the group consisting of the groups IA, IIA, IIIA, IVB and VB of the periodic table; and B comprises at least one element selected from the group consisting of the groups IVA and VA of the periodic table, wherein the oxide thin film has a mixed structure in which crystal grains having a grain size of 50 nm to 500 nm are dispersed in an amorphous phase or an ultrafine grain phase; i.e., the boundary voids among crystal grains are filled with an amorphous phase or an ultrafine grain phase.

The present invention also provides a process for preparing the above-mentioned oxide thin film, which comprises preparing an organic solvent solution (1) of a metal alkoxide compound of A and a metal alkoxide compound of B; adding water, or water and a catalyst to the organic solvent solution (1) to prepare a solution (2); mixing the organic solvent solution (1) and the solution (2) to prepare a mixed solution; coating the mixed solution on a substrate to form a thin film; and subjecting the thin film to heat treatment.

In a preferred embodiment of the present invention, a ratio of the content of the metal alkoxide compound in the organic solvent solution (1) to the content of the metal alkoxide compound in the solution (2) is from 1:0.01 to 1:100 by mole.

The terminology "ultrafine grain phase" as used herein means a phase comprising oxide grains represented by formula $ABO_3$ which have a grain size of not greater than 50 nm, preferably not greater than 10 nm.

DETAILED DESCRIPTION OF THE INVENTION

Figure 1:
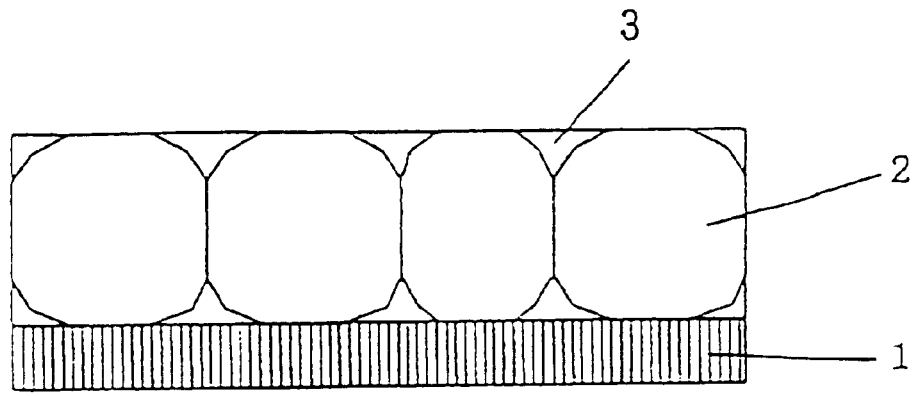
FIG. 1 is a schematic view of the cross section of an oxide thin film prepared by a conventional process.

In formula $ABO_3$ representing the oxide of the present invention, A is selected from the elements belonging to the groups IA, IIA, IIIA, IVB, and VB of the periodic table, and B is selected from the elements belonging to the groups IVA and VA of the periodic table. Ba and/or Sr may be mentioned as typical examples of A. Ti may be mentioned as a typical example of B. The present invention is particularly effective where A is Ba and/or Sr, and B is Ti. That is, $ABO_3$ is preferably $BaTiO_3$, $(Ba_xSr_{1-x})TiO_3$ (0<x<1), and $SrTiO_3$.

The organic solvent solution (1) of a metal alkoxide compound of A and a metal alkoxide compound of B is not particularly limited as far as the metal alkoxide compound of A and the metal alkoxide compound of B are dissolved in an organic solvent. It is preferable that A and B are in the form of their complex metal alkoxide compound, dissolved in an organic solvent.

The organic ligand of complex metal alkoxide compound is preferably selected from those represented by $R^1O—$ or $R^2OR^3O—$, wherein $R^1$ and $R^2$ each represent an aliphatic hydrocarbon group; and $R^3$ represents a divalent aliphatic hydrocarbon group which may contain an ether linkage. In particular, organic ligands represented by $R^2OR^3O—$ in which $R^2$ represents an aliphatic hydrocarbon group having 1 to 4 carbon atoms, and $R^3$ represents an aliphatic hydrocarbon group having 2 to 4 carbon atoms are preferred for their capability of forming a dense film. Specific examples of the organic ligands $R^1O—$ are $C_2H_5O—$, $C_3H_7O—$, and $C_4H_9O—$; and those of the organic ligands $R^2OR^3O—$ include $CH_3OC_2H_4O—$, $C_2H_5OC_2H_4O—$, $C_3H_7OC_2H_4O—$, $C_4H_9OC_2H_4O—$, and $C_2H_5OC_2H_4OC_2H_4O—$.

The complex metal alkoxide compound containing A and B can be synthesized by distilling and/or refluxing a metal alkoxide compound containing A and a metal alkoxide compound containing B at a prescribed composition in an organic solvent represented by formula $R^1OH$ or $R^2OR^3OH$, wherein $R^1$, $R^2$, and $R^3$ are as defined above.

In the formula $R^1OH$ or $R^2OR^3OH$ representing an organic solvent, the aliphatic hydrocarbon group as $R^1$ and $R^2$ is preferably an alkyl group having 1 to 4 carbon atoms, and $R^3$ preferably represents an alkylene group having 2 to 4 carbon atoms or a divalent group having 4 to 8 carbon atom which is composed of alkylene groups having 2 to 4 carbon atoms linked together via an ether linkage. Specific but non-limiting examples of suitable organic solvents include alcohols, such as methanol, ethanol, propanol and butanol; ethylene glycol monoalkyl ethers, such as ethylene glycol monomethyl ether, ethylene glycol monoethyl ether, ethylene glycol monopropyl ether, and ethylene glycol monobutyl ether; diethylene glycol monoalkyl ethers, such as diethylene glycol monomethyl ether, diethylene glycol monoethyl ether, and diethylene glycol monopropyl ether; 1,2-propylene glycol monoalkyl ethers, such as 1,2-propylene glycol monomethyl ether; and 1,3-propylene glycol monoalkyl ethers, such as 1,3-propylene glycol monomethyl ether, 1,3-propylene glycol monoethyl ether, and 1,3-propylene glycol monopropyl ether. These organic solvents may be used either individually or as a mixture of two or more thereof.

The complex metal alkoxide compound as synthesized above is obtained in a dissolved state in the organic solvent used. If desired, other organic solvents may be added to the solution. It depends on the kinds of the metal alkoxide compounds and organic solvent used whether the organic ligand ($R^1O—$ or $R^2OR^3O—$) in the resulting complex metal alkoxide compound and the group $R^1O—$ or $R^2OR^3O—$ of the organic solvent dissolving the complex metal alkoxide compound are the same or different as a result of ester exchange. Either case is included under the scope of the present invention. Note that, however, where $R^3$ in the organic ligand has 4 or more carbon atoms, it is preferable that $R^3$ in the organic solvent is different from that in the organic ligand from the standpoint of coating properties.

The concentration of the complex metal alkoxide compound in organic solvent solution (1) is 0.01 to 10 M, preferably 0.05 to 2.0 M.

The solution (2) may be prepared by adding water, or water and a catalyst, to part of the organic solvent solution (1) thus prepared. On reacting at 0 to 150° C., the metal alkoxide compound dissolved in the solution (2) undergoes hydrolysis or partial hydrolysis in the solution. The amount of water to be added is 0.1 to 4 mol, preferably 0.5 to 3 mol, per 1 mol of the metal alkoxide compound. The catalyst is used in an amount of 0.01 to 1.0 mol, preferably 0.15 to 0.5 mol, per 1 mol of the metal alkoxide compound. If the amounts of water and/or the catalyst are less than the above range, the hydrolysis reaction hardly proceeds. If the amounts are greater than the above range, the hydrolysis reaction abruptly proceeds, resulting in formation of a precipitate or gelation of the solution, failing to provide a homogeneous solution. The catalyst to be used include ammonia, nitric acid, hydrochloric acid, and acetic acid.

The organic solvent solution (1) and the solution (2) thus prepared are mixed at a specific mixing ratio to prepare a mixed solution. A preferred mixing ratio is such that a ratio of the content of the metal alkoxide compound in the organic solvent solution (1) to the content of the metal alkoxide compound in the solution (2) is from 1:0.01 to 1:100 by mole, more preferably from 1:0.1 to 1:10 by mole. Mixing ratios out of this range tend to fail to achieve the objects of the present invention.

The substrate to which the mixed solution is to be applied is not particularly limited as far as it is fit to the end use. For example, $ITO/SiO_2$ glass, $Pt/Ti/SiO_2/Si$, and $Al_2O_3$ can be used. The mixed solution can be applied to the substrate by spin coating, dip coating, spray coating, screen printing, ink jet printing, and the like.

The coated substrate is then subjected to heat treatment. For example, the substrate is heated at a rate of 0.1 to 500° C./sec and maintained at a temperature at which the coating layer thermally decomposes but does not crystallize, e.g., 100 to 500° C. The coating layer is further treated at a temperature ranging from 100 to 800° C. to induce crystallization.

If desired, coating with the solution can be repeated. In this case, each time the substrate is coated with the mixed solution, it is heated in the same manner as described above to cause thermal decomposition of the coating layer. After repeating the coating and the thermal decomposition prescribed times, the oxide layer is finally heat-treated at 100 to 800° C. to be crystallized.

Figure 2:
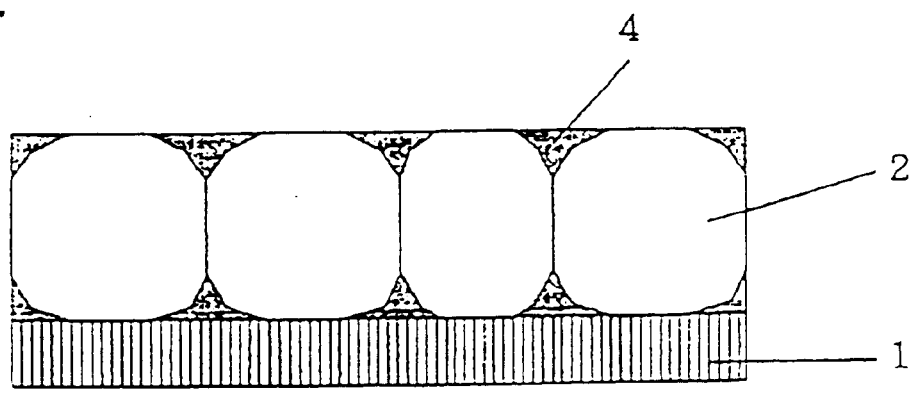
FIG. 2 is a schematic view of the cross section of an oxide thin film according to the present invention.
Figure 3:
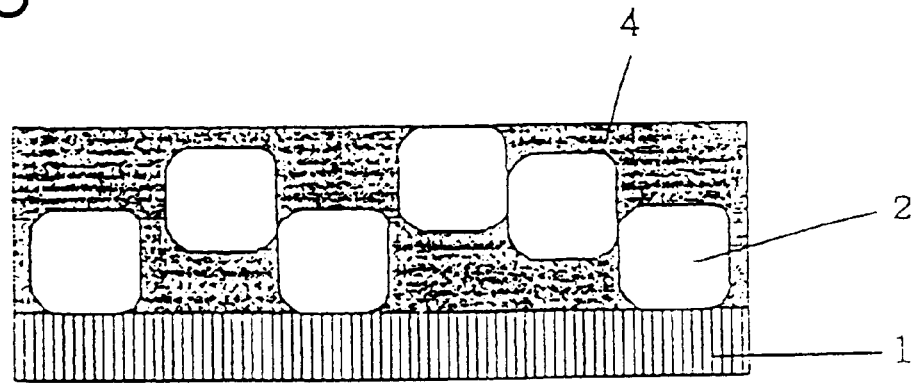
FIG. 3 is a schematic view of the cross section of another oxide thin film according to the present invention.

The oxide thin film of the present invention is explained by referring to FIGS. 1 to 3. FIG. 1 schematically illustrates an oxide thin film formed on substrate 1 by a conventional process, in which there are boundary voids 3 among neighboring crystal grains 2. FIGS. 2 and 3 each schematically illustrate an oxide thin film according to the present invention, in which reference numeral 4 indicates an amorphous phase or an ultrafine grain phase. The film of FIG. 2 is obtained from a mixed solution containing solution (2) at a high proportion, while that of FIG. 3 is obtained from a mixed solution containing organic solvent solution (1) at a high proportion.

The oxide thin film according to the present invention preferably has a thickness of 1 nm to 10,000 nm.

The metal alkoxide component in solution (2), which contains water or both water and a catalyst, is structurally close to a final oxide $ABO_3$. Therefore, it is easily crystallized at a relatively low temperature, and the crystal grains thus formed are allowed to grow to thereby improve dielectric characteristics. To the contrary, the metal alkoxide component in organic solvent solution (1), which contains no water, hardly crystallizes under the heat treatment and is rather apt to form an amorphous phase or an ultrafine grain phase. Where a mixture of these solutions is formed into a film under appropriately selected conditions, a pinhole-free oxide thin film is obtained in which boundary voids among crystal grains are filled with an amorphous phase or an ultrafine grain phase as is shown in FIG. 2 or 3.

The present invention will now be illustrated in greater detail with reference to Examples, but it should be understood that the present invention is not deemed to be limited thereto.

EXAMPLE 1

$Ti(O\text{---}i\text{---}C_3H_7)_4$ and $Sr(OC_2H_5)_2$ were dissolved at a Ti:Sr molar ratio of 1:1 in ethylene glycol monoethyl ether which had been dehydrated with Molecular Sieves to prepare a 0.6 M solution. The resulting solution was distilled at 135° C. for 2 hours while stirring and then refluxed for 18 hours with stirring to obtain solution I containing a complex metal alkoxide compound $SrTi(OC_2H_4OC_2H_5)_6$.

A part of solution I was adjusted to a concentration 0.5 M to prepare solution II. To another part of solution I were added water and ammonia at a water:Ti molar ratio of 1:1 and an ammonia:Ti molar ratio of 0.15:1, respectively. After stirring the solution at 100° C. for 3 hours, the concentration was adjusted to 0.5 M to prepare solution III.

Solution II (0.5 M) and solution III (0.5 M) were mixed at a volume ratio of 1:1 to prepare a mixed solution for coating. The mixed solution was applied to an ITO/glass substrate by spin coating, heated at a rate of 10° C./sec, and maintained at 300° C. for 2 minutes and then at 450° C. for 30 minutes to form an $SrTiO_3$ thin film.

Figure 4:
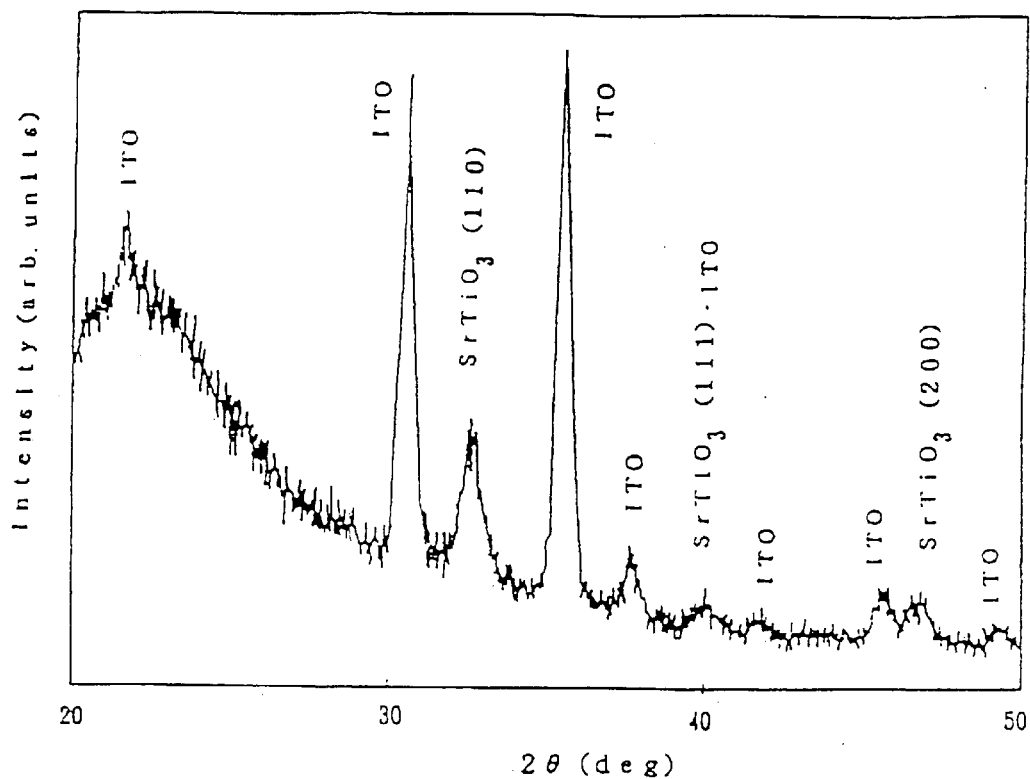
FIG. 4 is an X-ray diffraction pattern of the oxide thin film obtained in Example 1.

The X-ray diffraction pattern of the resulting $SrTiO_3$ thin film is shown in FIG. 4. The surface of the film was found optically smooth and transparent. TEM observation of the cross section of the film revealed that the film was substantially occupied by crystal grains, with the boundary voids among crystal grains being filled with ultrafine grains having a grain size of about 5 nm, as shown in FIG. 2.

A Pt electrode was set on the $SrTiO_3$ thin film, and a leakage current was measured with an electrometer Keithley 617. As a result, the leakage current was $1\times10^{-7}$ $A/cm^2$ at an applied voltage of 2 V.

COMPARATIVE EXAMPLE 1

$Ti(O\text{---}i\text{---}C_3H_7)_4$ and $Sr(OC_2H_5)_2$ were dissolved at a Ti:Sr molar ratio of 1:1 in ethylene glycol monoethyl ether which had been dehydrated with Molecular Sieves to prepare a 0.6 M solution. The resulting solution was distilled at 135° C. for 2 hours while stirring and then refluxed for 18 hours with stirring to obtain a solution containing a complex metal alkoxide compound $SrTi(OC_2H_4OC_2H_5)_6$. The solution was adjusted to a concentration of 0.5 M. An oxide thin film was formed using the resulting solution in the same manner as in Example 1. The leakage current of the resulting film was $1\times10^{-7}$ $A/cm^2$ at an applied voltage of 2 V as measured in the same manner as in Example 1, but the results of X-ray diffractometry showed that the film had poor crystallinity and was nearly amorphous.

COMPARATIVE EXAMPLE 2

$Ti(O\text{---}i\text{---}C_3H_7)_4$ and $Sr(OC_2H_5)_2$ were dissolved at a Ti:Sr molar ratio of 1:1 in ethylene glycol monoethyl ether which had been dehydrated with Molecular Sieves to prepare a 0.6 M solution. The resulting solution was distilled at 135° C. for 2 hours while stirring and then refluxed for 18 hours with stirring to obtain a solution containing a complex metal alkoxide compound $SrTi(OC_2H_4OC_2H_5)_6$. To the solution were added water and ammonia at a water:Ti molar ratio of 1:1 and an ammonia:Ti molar ratio of 0.15:1, respectively. After stirring the solution at 100° C. for 3 hours, the concentration was adjusted to 0.5 M. An oxide thin film was formed using the resulting solution in the same manner as in Example 1. Although the resulting film exhibited satisfactory crystallinity as analyzed by X-ray diffractometry, the leakage current of the film was $1\times10^{-6}$ $A/cm^2$ at an applied voltage of 2 V.

EXAMPLE 2

$Ba(OC_2H_5)_2$, $Sr(OC_2H_5)_2$, and $Ti(O\text{---}i\text{---}C_3H_7)_4$ were dissolved at a Ba:Sr:Ti molar ratio of 0.6:0.4:1 in ethylene glycol monoethyl ether which had been dehydrated with Molecular Sieves to prepare a 0.6 M solution. The resulting solution was distilled at 135° C. for 2 hours while stirring and then refluxed for 22 hours with stirring to obtain solution I containing a complex metal alkoxide compound $(Ba_{0.6}Sr_{0.4})Ti(OC_2H_4OC_2H_5)_6$.

A part of solution I was adjusted to a concentration 0.5 M to prepare solution II. To another part of solution I were added water and ammonia at a water:Ti molar ratio of 1:1 and an ammonia:Ti molar ratio of 0.15:1, respectively. After stirring the solution at 100° C. for 3 hours, the concentration was adjusted to 0.5 M to prepare solution III.

Solution II (0.5 M) and solution III (0.5 M) were mixed at a volume ratio of 1:1 to prepare a mixed solution for coating. The mixed solution was applied to an ITO/glass substrate by spin coating, heated at a rate of 10° C./sec, and maintained at 300° C. for 2 minutes and then at 500° C. for 30 minutes to form a $(Ba_{0.6}Sr_{0.4})TiO_3$ thin film.

Figure 5:
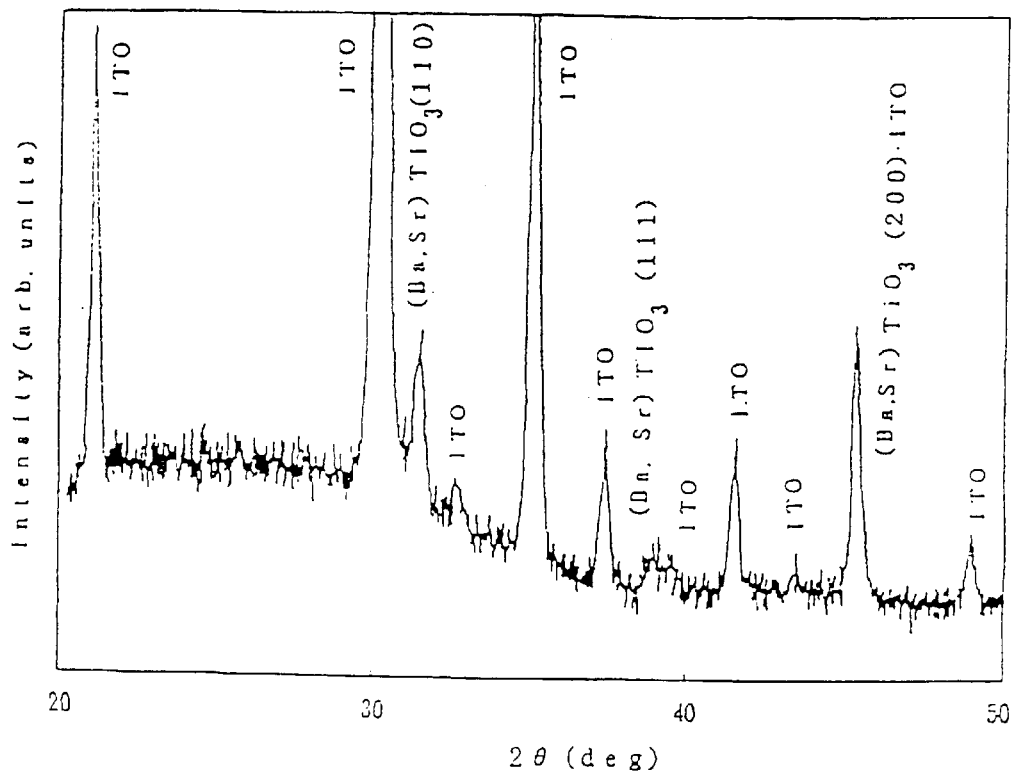
FIG. 5 is an X-ray diffraction pattern of the oxide thin film obtained in Example 2.

The X-ray diffraction pattern of the resulting $(Ba_{0.6}Sr_{0.4})TiO_3$ thin film is shown in FIG. 5. The surface of the film was found optically smooth and transparent. TEM observation of the cross section of the film revealed that the film was substantially occupied by crystal grains, with the boundary voids among crystal grains being filled with an amorphous phase as shown in FIG. 2.

A Pt electrode was set on the thin film, and a leakage current was measured. As a result, the leakage current at an applied voltage of 2 V was $1\times10^{-7}$ A/cm$^2$.

COMPARATIVE EXAMPLE 3

Solution II prepared in Example 2 was applied to an ITO/glass substrate by spin coating, and the coated substrate was heated at a rate of 10° C./sec and maintained at 300° C. for 2 minutes and then at 500° C. for 30 minutes. The resulting $(Ba_{0.6}Sr_{0.4})TiO_3$ thin film had a leakage current of $1\times10^{-7}$ A/cm$^2$ at an applied voltage of 2 V, but the results of X-ray diffractometry showed that the film had poor crystallinity and was nearly amorphous.

COMPARATIVE EXAMPLE 4

Solution III prepared in Example 2 gas applied to an ITO/glass substrate by spin coating, and the coated substrate was heated at a rate of 10° C./sec and maintained at 300° C. for 2 minutes and then at 500° C. for 30 minutes. The resulting $(Ba_{0.6}Sr_{0.4})TiO_3$ thin film had satisfactory crystallinity and comprised a single perovskite phase, had an optically smooth surface, and was transparent. However, the leakage current was $1\times10^{-6}$ A/cm$^2$ at an applied voltage of 2 V.

EXAMPLE 3

A $(Ba_{0.6}Sr_{0.4})TiO_3$ thin film was formed in the same manner as in Example 2, except for replacing the ITO/glass substrate with a Pt/Ti/SiO$_2$/Si substrate. As a result of X-ray diffractometry, the resulting film exhibited satisfactory crystallinity and was optically smooth and transparent. TEM observation of the cross section of the film revealed that the film was substantially occupied by crystal grains, with the boundary voids among crystal grains being filled with an amorphous phase as shown in FIG. 2. A Pt electrode was set on the thin film, and a leakage current was measured. As a result, the leakage current at an applied voltage of 2 V was $8\times10^{-8}$ A/cm$^2$.

As described above, the oxide thin film according to the present invention comprises an oxide represented by ABO$_3$ wherein A comprises at least one element selected from the group consisting of the groups IA, IIA, IIIA, IVB and VB of the periodic table; and B comprises at least one element selected from the group consisting of the groups IVA and VA of the periodic table, in which crystal grains are dispersed in an amorphous phase or an ultrafine grain phase, i.e., the boundary voids among crystal grains are filled with an amorphous phase or an ultrafine grain phase. Therefore, the oxide thin film of the present invention is free from pinholes and excellent in dielectric characteristics and has a small leakage current.

The process according to the present invention comprises coating a substrate with a mixed solution comprising (1) an organic solvent solution of a metal alkoxide compound of A and a metal alkoxide( compound of B and (2) a solution prepared by adding water, or water and a catalyst, to the organic solvent solution (1). Therefore, an oxide thin film which is uniform, exhibits excellent stoichiometry, and has a reduced leakage current can be obtained at a relatively low temperature. The oxide thin film obtained by the present invention is therefore suitable for use in thin film condensers and capacitors, piezoelectric devices, pyroelectric devices, etc.

While the invention has been described in detail and with reference to specific embodiments thereof, it will be apparent to one skilled in the art that various changes and modifications can be made therein without departing from the spirit and scope thereof.

What is claimed is:

1. A process for preparing an oxide thin film comprising an oxide represented by ABO$_3$, wherein A comprises at least one element selected from the group consisting of the Groups IA, IIA, IIIA, IVB and VB of the periodic table, and B comprises at least one element selected from the group consisting of the groups IVA and VA of the periodic table, which comprises:

preparing an organic solvent solution (1) of a metal alkoxide compound of A and a metal alkoxide compound of B; adding water, or water and a catalyst to a first part of the organic solvent solution (1) to prepare a solution (2);

mixing a second part of the organic solvent solution (1) and the solution (2) to prepare a mixed solution;

coating the mixed solution on a substrate to form a thin film; and subjecting the thin film to heat treatment.

2. The process as claimed in claim 1, wherein a mole ratio of the content of the metal alkoxide compound of A or B in the organic solvent solution (1) to that in the solution (2) is from 1:0.01 to 1:100.

3. The process as claimed in claim 1, wherein the heating treatment comprises a first step of thermally decomposing the thin film at a temperature at which crystallization does not occur and a second step of crystallizing the thin film at a temperature inducing crystallization after the first step.

4. The process as claimed in claim 2, wherein the organic solvent solution (1) is an organic solvent solution of a complex metal alkoxide compound containing A and B.

5. The process as claimed in claim 2, wherein the solution (2) is obtained by adding water in an amount of 0.1 to 4 mol per 1 mol of the metal alkoxide compound of A or B to the organic solvent solution (1) to prepare a solution, and allowing the resulting solution to react at a temperature of 0° C. to 150° C.

6. The process as claimed in claim 2, wherein the solution (2) is obtained by adding (i) water in an amount of 0.1 to 4 mol per 1 mol of the metal alkoxide compound of A or B and (ii) the catalyst in an amount of 0.01 mol to 0.5 mol per 1 mol of the metal alkoxide compound of A or B to the organic solvent solution (1) to prepare a solution, and allowing the resulting solution to react at a temperature of 0° C. to 150° C.

7. The process as claimed in claim 4, wherein the solution (2) is obtained by adding water in an amount of 0.1 to 4 mol per 1 mol of the complex metal alkoxide compound containing A and B to the organic solvent solution (1) to prepare a solution, and allowing the resulting solution to react at a temperature of 0° C. to 150° C.

8. The process as claimed in claim 4, wherein the solution (2) is obtained by adding (i) water in an amount of 0.1 to 4 mol per 1 mol of the complex metal alkoxide compound containing A and B and (ii) the catalyst in an amount of 0.01 mol to 0.5 mol per 1 mol of the complex metal alkoxide compound containing A and B to the organic solvent solution (1) to prepare a solution, and allowing the resulting solution to react at a temperature of 0° C. to 150° C.

9. The process as claimed in claim 2, wherein A comprises at least one element selected from the group consisting of Ba and Sr, and B is Ti.

10. The process as claimed in claim 4, wherein the complex metal alkoxide compound containing A and B has an organic ligand represented by $R^1O$— or $R^2OR^3O$—, wherein $R^1$ and $R^2$ each represents an aliphatic hydrocarbon group, and $R^3$ represents a divalent aliphatic hydrocarbon group which may contain an ether linkage.

11. The process as claimed in claim 2, wherein the organic solvent used in the organic solvent solution (1) is a compound represented by $R^1OH$ or $R^2OR^3OH$, wherein $R^1$ and $R^2$ each represents an aliphatic hydrocarbon group, and $R^3$ represents a divalent aliphatic hydrocarbon group which may contain an ether linkage.

12. The process as claimed in claim 4, wherein the organic solvent used in the organic solvent solution (1) is a compound represented by $R^1OH$ or $R^2OR^3OH$, wherein $R^1$ and $R^2$ each represents an aliphatic hydrocarbon group, and $R^3$ represents a divalent aliphatic hydrocarbon group which may contain an ether linkage.

13. A process for preparing an oxide thin film comprising an oxide represented by $ABO_3$, wherein A comprises at least one element selected from the group consisting of the Groups IA, IIA, IIIA, IVB and VB of the periodic table, and B comprises at least one element selected from the group consisting of the groups IVA and VA of the periodic table, which comprises:

preparing an organic solvent solution (1) of a metal alkoxide compound of A and a metal alkoxide compound of B;

adding water, or water and a catalyst to a first part of the organic solvent solution (1) to prepare a solution (2);

mixing a second part of the organic solvent solution (1) and the solution (2) to prepare a mixed solution, wherein a mole ratio of the content of the metal alkoxide compounds of A and B in the organic solvent solution (1) to that in the solution (2) is from 1:0.01 to 1:100;

coating the mixed solution on a substrate to form a thin film;

thermally decomposing the thin film at a temperature at which crystallization does not occur;

repeating the coating step and the thermally decomposing steps; and crystallizing the thin film at a temperature inducing crystallization.

* * * * *